United States Patent [19]

Strolle et al.

[11] Patent Number: 4,661,850

[45] Date of Patent: Apr. 28, 1987

[54] PROGRESSIVE SCAN TELEVISION SYSTEM WITH INTERLACED INTER-FIELD SUM AND DIFFERENCE COMPONENTS

[75] Inventors: Christopher H. Strolle, Glenside, Pa.; Glenn A. Reitmeier, West Trenton, N.J.

[73] Assignee: RCA Corporation, Princeton, N.J.

[21] Appl. No.: 824,902

[22] Filed: Jan. 31, 1986

[51] Int. Cl.[4] ............... H04N 7/01; H04N 11/06; H04N 11/14

[52] U.S. Cl. ............... 358/140; 358/11; 358/12; 358/135; 358/136

[58] Field of Search ............... 358/11, 12, 136, 140, 358/141, 135

[56] References Cited

U.S. PATENT DOCUMENTS

| | | | |
|---|---|---|---|
| 4,400,719 | 8/1983 | Powers | 358/21 R |
| 4,415,931 | 11/1983 | Dischert | 358/242 |
| 4,429,327 | 1/1984 | Oakley et al. | 358/12 |
| 4,523,220 | 6/1985 | Adelsen et al. | 358/12 |
| 4,533,951 | 8/1985 | Powers | 358/141 |
| 4,573,068 | 2/1986 | Dorsey et al. | 358/11 |

*Primary Examiner*—James J. Groody
*Assistant Examiner*—Michael D. Parker
*Attorney, Agent, or Firm*—P. J. Rasmussen; P. M. Emanuel; R. G. Coalter

[57] ABSTRACT

A progressively scanned video signal is encoded into temporal sum and difference components for transmission. The sum signal is temporally filtered, decimated and time expended to be compatible with interlaced receivers. The difference signal, also temporally filtered, decimated and time expanded, is conveyed via single or separate channels with the sum signal to a progressive scan receiver for reconstitution of the original progressive scan signal. Modified quadrature amplitude modulation is used to convey the sum and difference signals in a common channel.

10 Claims, 15 Drawing Figures

PROGRESSIVE SCAN TELEVISION SYSTEM WITH INTERLACED INTER-FIELD SUM AND DIFFERENCE COMPONENTS

FIELD OF THE INVENTION

This invention relates to television systems and particularly to systems of the type in which a high definition video signal is encoded into sum and difference components for transmission to a receiver which recombines the sum and difference components to reconstitute the video signal for display.

BACKGROUND OF THE INVENTION

The line structure of a raster scanned television display becomes more visible as the size and brightness of the display increase. This undesirable effect may be avoided by doubling the number of scanning lines in each field and displaying the lines in progressive scan (non-interlaced) form. An example of a progressive scan receiver, wherein the added lines are replicas (repeats) of the original scan lines, is described by R. A. Dischert in U.S. Pat. No. 4,415,931 entitled TELEVISION DISPLAY WITH DOUBLED HORIZONTAL LINES. In another form of progressive scan receiver, the "extra" lines for display are obtained by interpolation of adjacent vertical lines of the incoming video signal. See, for example, U.S. Pat. No. 4,400,719 of K. H. Powers entitled TELEVISION DISPLAY WITH REDUCED LINE SCAN ARTIFACTS.

The receivers of Powers and Dischert do not require any change in existing television broadcast standards. It has been recognized, however, that such receiver systems are subject to certain motion dependent artifacts characteristic of the interlaced scanning format employed in the cameras of conventional broadcast systems. Examples include effects such as serration of the edges of horizontally moving objects, double images, aliasing, and so on. Various arrangements have been proposed which avoid interlace motion artifacts by using progressive scanning (or spot wobble scanning) in both the camera and in the receiver display. The difficultly is to encode the progressive scan camera signal in such a manner as to be compatible with existing television transmission channels and standard (interlace scan) receivers as illustrated by the following examples.

As a first example, Oakley et al. in U.S. Pat. No. 4,429,327 entitled COMPATIBLE TELEVISION SYSTEM WITH INCREASED VERTICAL RESOLUTION describe a compatible NTSC system in which a spot wobbling technique is used in a camera to generate two lines of video for each line scanned. The lines are added to produce a compatible luminance signal and subtracted to provide a difference signal representing vertical resolution. Provision is made for transmitting the difference signal along with the sum signal by frequency interleaving the difference signal with the chroma signal in locations representing high frequency vertical information. Alternatively, Oakley et al. suggest transmitting the difference signal via a separate transmission channel. The sum and difference signals are recombined in a receiver for display on a kinescope employing spot wobble synchronized with that of the camera.

As a second example, K. H. Powers in U.S. Pat. No. 4,533,951 entitled SYSTEM FOR GENERATING AND DISPLAYING A COMPATIBLE HIGH DEFINITION TELEVISION SIGNAL BY PROGRESSIVE SCANNING, describes a spot wobble system in which a high definition (spot wobble) camera signal is low pass filtered to provide a limited bandwidth signal compatible with standard broadcast receivers. A difference signal is produced by subtracting the high definition and limited definition signals. In a receiver, the limited definition and difference signals are added to recreate the high definition signal for display. The difference signal and its addresses are transmitted to the receiver during the vertical blanking interval of the limited definition signal. In order to reduce the data rate of the difference signal, its generation is inhibited in regions of the picture which exhibit frame-to-frame motion.

As a further example, Adelsen et al. in U.S. Pat. No. 4,523,220 entitled COMPATIBLE HIGH DEFINITION TELEVISION SYSTEM UTILIZING HADAMARD BASIS FUNCTIONS describe a system in which a video signal provided by a high definition camera is converted into one sum signal and three difference signals. The sum signal represents the average of four contiguous pixels of the high definition signal and is compatible with standard television receivers. The three difference signal represent vertical, diagonal and horizontal resolution and one obtained by subtracting various combinations of the four pixel group that provides the compatible sum signal. Adelsen et al. suggest that the difference signals may be transmitted in the vertical or horizontal blanking intervals of the sum signal for subsequent reconstitution of the signal high definition signal in a receiver.

SUMMARY OF THE INVENTION

In the described systems the difference signal, which is used to enhance the detail of the displayed image, is a direct function of the "busyness" of the picture. Where, for example, the image to be transmitted has little vertical detail, the amplitude and bandwidth requirements for transmission of the difference signal are modest. As the vertical detail content increases, however, more information must be transmitted in the "enhancement channel" to convey the difference signal. For very detailed images the problem of channel overload may occur.

In accordance with an aspect of the invention, it is herein recognized that a progressive scan camera has the capability of providing additional information (as compared to an interlaced camera) sufficient to eliminate motion aliasing in a progressive scan display while allowing objects in motion to maintain the full vertical resolution they have when they are still. Moreover, by processing the progressive scan signal as herein described, it is possible to substantially reduce the problem of channel overload for "busy" images.

A progressive scan encoder embodying the invention comprises a signal source means for providing a first luminance signal of progressive scan form having a line rate double that of a given broadcast standard. A temporal filter means, coupled to the source, adds corresponding lines of adjacent fields of the luminance signal to provide a sum signal and subtracts corresponding lines of adjacent fields to provide a difference signal. A sub-sampling time-expanding converter means, coupled to the temporal filter means, selects every other line of each of the sum and difference signals and time expands the selected lines of each of the sum and difference signals by a factor of two to provide processed sum and difference output signals for transmission.

A progressive scan receiver embodying the invention includes means for separating the processed sum signal into high and low frequency portions. A first speed-up means doubles the line rate of the high frequency portion by time compressing and interleaving lines of currently received and previous fields. A second speed-up unit generates a double line rate of the enhancement signal by matrixing and time compressing the low frequency portion of the sum signal with the difference signal. The double line-rate signals of the two speed-up means are combined and applied to a display means.

BRIEF DESCRIPTION OF THE DRAWING

The invention is illustrated in the accompanying drawing wherein like elements are denoted by like designators and in which.

DETAILED DESCRIPTION

Figure 1:
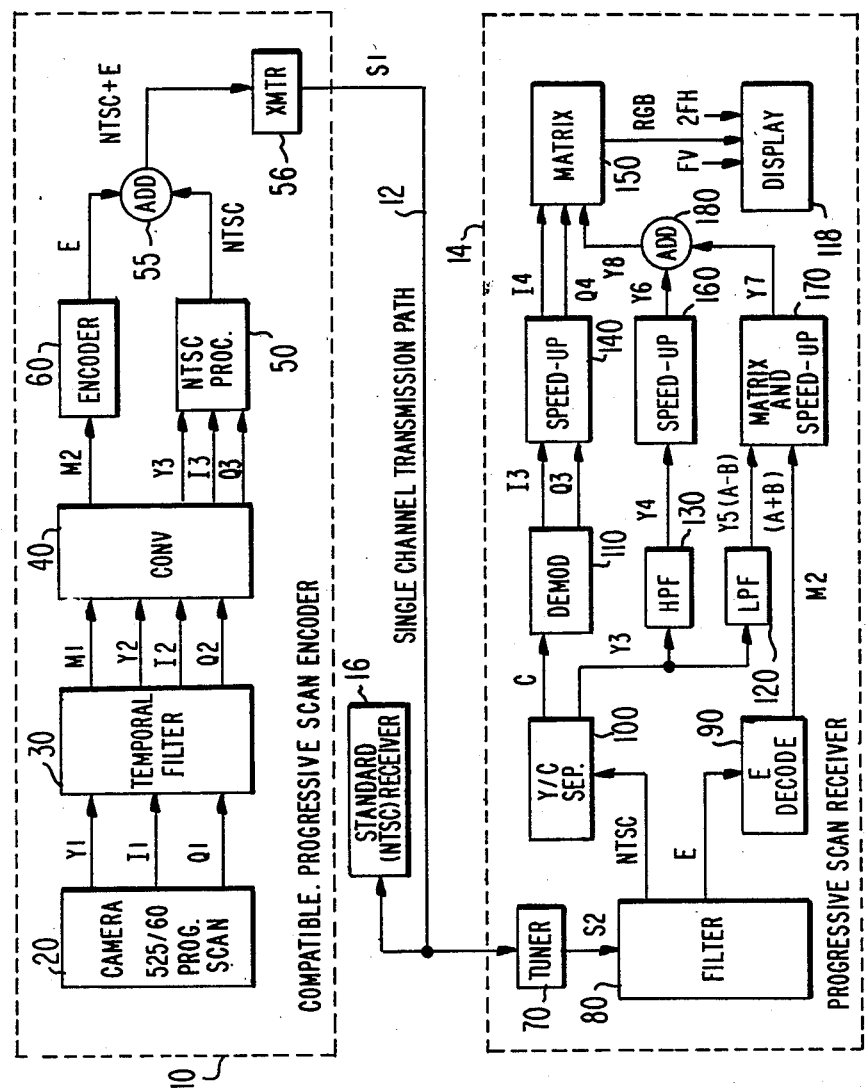
FIG. 1 is a block diagram of a progressive scan television system embodying the invention.
Figure 2:
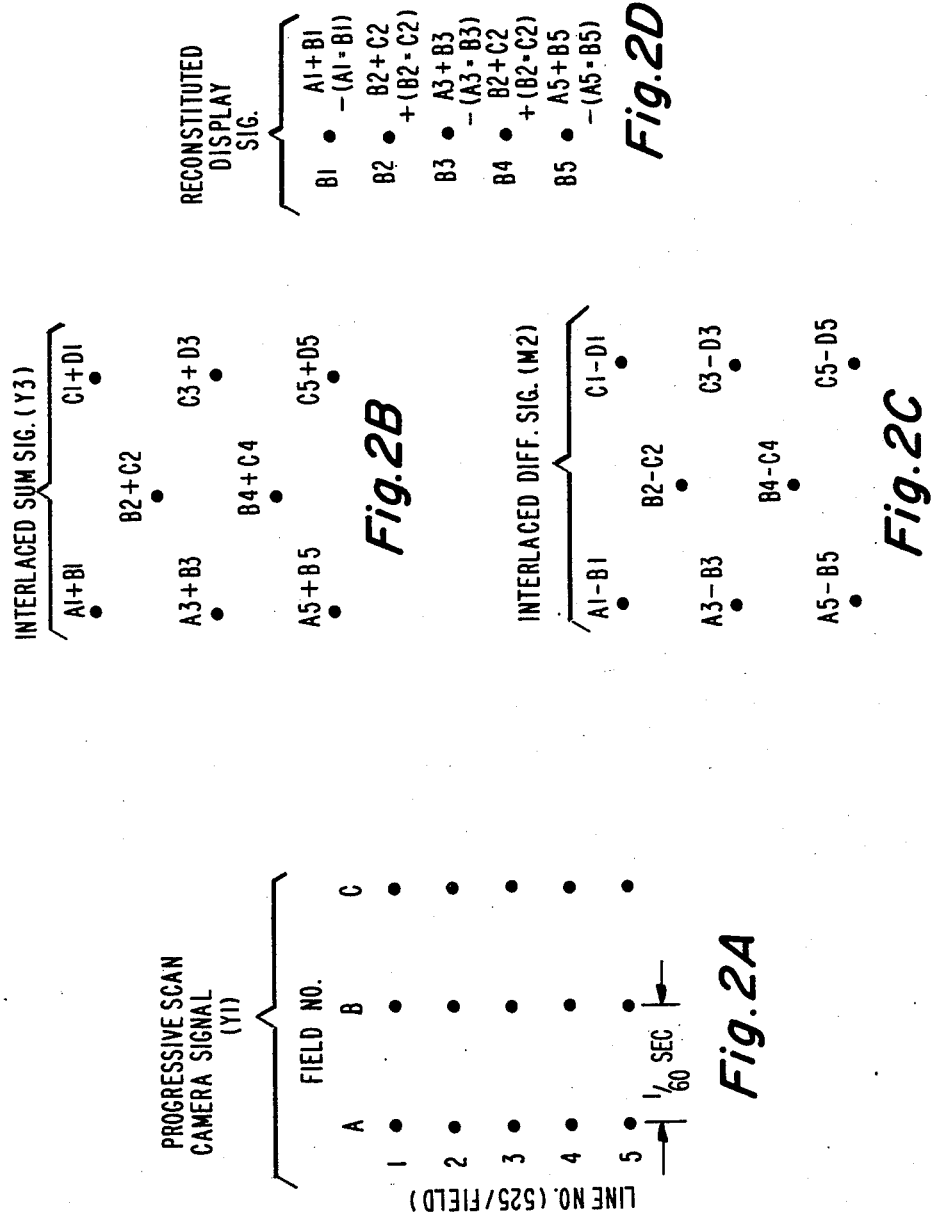
FIGS. 2A, 2B, 2C and 2D are spatio-temporal diagrams illustrating operation of the system of FIG. 1.

In FIG. 1, compatible progressive scan encoder 10 produces an enhanced NTSC standard video output signal S1 that is coupled via a single channel transmission path 12 to a progressive scan receiver 14 and to a standard interlaced (NTSC) receiver 16. Encoder 10 includes a progressive scan camera 20 that provides non-interlaced (progressively scanned) video output signals (Y1, I1 and Q1) of 525 lines per field and 60 fields per second (more accurately, the field rate is 59.94 FPS). Camera 20 may be implemented as shown in the detailed encoder diagram of FIG. 3 by supplying standard NTSC field rate (FV) and double line rate (2 FH) sweep signals to a conventional RGB camera 22 from a timing unit 24 and converting the progressive scan RGB signals to YIQ form in a conventional matrix 26. The scanning pattern of camera 20 is shown in FIG. 2A. During each field (A, B and C) 525 lines are scanned progressively in one-sixtieth of a second. As seen, this is double the normal NTSC scan rate and the lines are not interlaced.

The remaining elements of encoder 10 perform the task of converting the progressive scan pattern of FIG. 2A to a compatible interlaced form which may be displayed without creating artifacts on the standard NTSC receiver 16 and yet is of such a form that all the lines of FIG. 2A may be reconstituted in the display 16 of progressive scan receiver 14.

Figure 3:
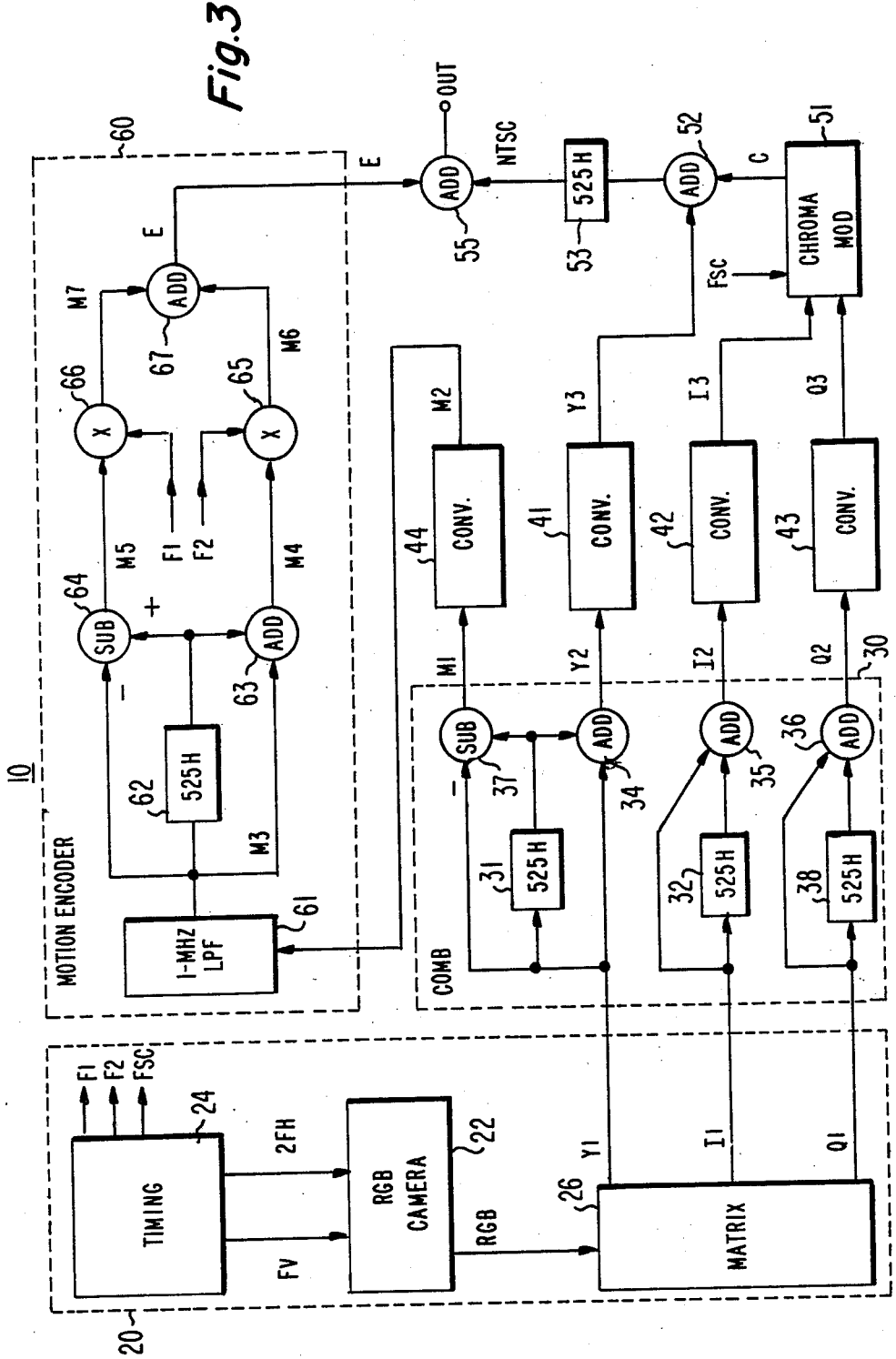
FIG. 3 is a detailed block diagram of the encoding portion of the system of FIG. 1.

A first step in this process comprises temporally filtering the Y1, I1, Q1 signals in filter 30. This filter provides the functions of adding corresponding lines of adjacent fields of the Y1, I1 and Q1 signals to provide three sum output signals Y2, I2 and Q2. Filter 30 also subtracts corresponding lines of adjacent fields of luma signal Y1 to provide a difference signal M1 representative of image motion. Referring to FIG. 2A, signal Y2 equals the sum A1+B1, A2+B2, A3+B3 . . . etc throughout a field and signal M1 equals the differences A1−B1, A2−B2, A3−B3 . . . etc. FIG. 3 provides a specific implementation of filter 30. Signals Y1, I1 and Q1 are delayed by respective field delay elements 31-33 (525 lines or 1/60 sec) with the field delayed and non-delayed signals added in respective adders 34-36 to form the sum signals Y2, I2 and Q2. The difference signal (motion signal M1) is produced by a subtractor 37 coupled to the input and output of delay element 31.

The next step in the encoding process comprises sub-sampling and time expanding each of the sum and difference signals provided by filter 30 to generate the scanning patterns for the sum and difference signals illustrated in FIGS. 2B and 2C, respectively. This function is provided by converter 40 which selects every other line of each of the sum and difference signals and time expands the selected lines by a factor of two to provide the processed sum output signals Y3, I3, Q3 and the processed difference output signal M2.

Figure 4A:
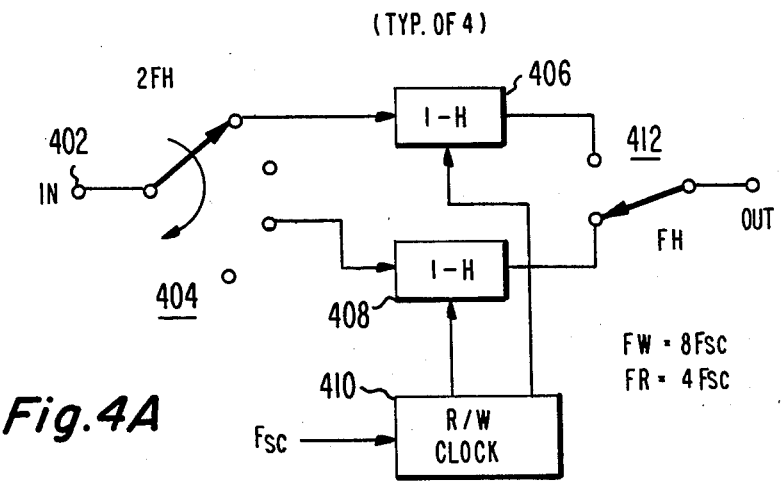
FIGS. 4A and 4B are detailed block diagrams of sub-sampling (decimating) interlace converters for use in the encoding system of FIG. 3.
Figure 4B:
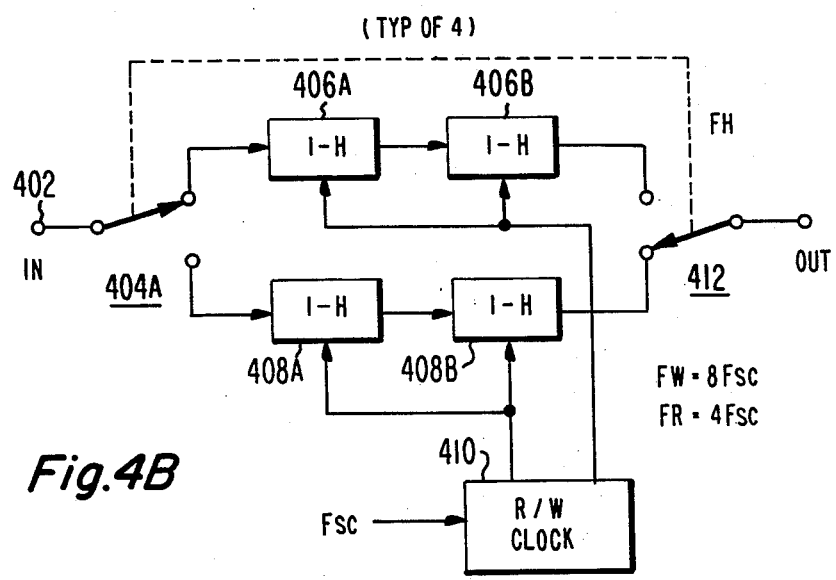

Converter 40 comprises four separate (identical) converters 41-44 (FIG. 3) each of which may be implemented as shown in FIGS. 4A or 4B. In FIG. 4A the input signal (Y2, I2, Q2 or M1) at input 402 is applied to the wiper of a four position switch 404 which is advanced at the line rate of camera 20 which is twice (2 FH) the NTSC line rate. The signals at the first and third poles of switch 404 are stored in respective one line (1-H) memories 406 and 408 at a write clock frequency, illustratively, of 8 times the system color subcarrier (8 Fsc) provided by R/W clock 410. Since two poles of switch 404 are not connected, only every other line of the sum (or difference) signals is stored. The stored lines are alternately recovered by a line rate (FH) switch 412. Each stored line is time expanded by a factor of two during readout by selecting a read clock frequency, illustratively, of 4 Fsc (one-half the write clock frequency). The line skipping provided by switch 404 thus interlaces the signals (FIGS. 2B, 2C) and the read/write clock frequency change thus time expands the selected lines (from 31.75 microseconds of camera 20 to the NTSC standard of 63.5 microseconds). The arrangement of FIG. 4B is functionally identical to FIG. 4A but employs a two-position line-rate switch 404A and 2-H memory storage. The memories store two lines at a time at the 8 Fsc write clock rate but only one stored line is recovered because the read clock frequency is half that of the write clock. Thus, every other line is discarded and the lines recovered are time expanded by two.

After processing in converter 40, the signals Y3, I3 and Q3 are of interlaced form and conform to NTSC standard line and field rates and so are fully compatible with receiver 16. It may be advantageous to temporally filter signal Y3 in the 1-3 MHz region to minimize interference with the enhancement signal E that is later translated to this region. There signals are applied to an NTSC processor 50 which generates a composite NTSC signal that is combined with an enhancement signal E in adder 55 and applied to a conventional transmitter 56 for transmission via path 12 to receivers 14 and 16. Unit 50 may be implemented as shown in FIG. 3 by a conventional chroma modulator 51 and adder 52. A 525 line (one frame) delay element 53 delays the composite NTSC signal to compensate for enhancement signal processing delays.

Enhancement signal E is provided by an encoder 60 which translates the interlaced inter-field motion signal M2 to a midband region (1-3 MHz) of the luminance frequency band in such a manner as to avoid interference with the composite video signal. Details of encoder 60 are shown in FIG. 3. The encoder includes a low pass filter 61 which limits the bandwidth of motion signal M2 to 1 MHz. The filtered signal M3 is then frame comb filtered by means of a frame delay element (525 lines) 62, an adder 63 and a subtractor 64. The adder and subtractor output signals M4 and M5 are multiplied in multipliers 65 and 66 by respective conversion frequencies F2 and F1 and the resultant product signals (M6 and M7) are combined in adder 67 to generate the enhancement signal E.

It will be noted from FIGS. 2B and 2C that one cannot simply add signals Y3 and M3 because half the terms would obviously cancel. Encoder 60 translates signal M2 to the 1-3 MHz portion of the luma band by means of quadrature amplitude modulations (QAM) employing specially selected conversion frequencies F1 and F2. Quadrature modulation is chosen in order to transmit the 1 MHz wide M4 signal and the 1 MHz wide M5 signal simultaneously in the 1-3 MHz region. Since signals M4 and M5 are zero when there is no motion, and since the QAM signal is a suppressed carrier modulation, there is no possibility of interference for still images. The purpose of low pass filtering signal M2 to 1-MHz prior to quadrature modulation is to ensure that the modulated bandwidth does not extend below 1-MHz or above 3-MHz, thus avoiding any possibility of interference with low frequency luma components and minimal interference with chroma. Midband luma and chroma interference are minimized, as will be explained, by selection of the conversion frequencies.

The low pass filtered motion signal M3 is not of a form that can be quadrature modulated directly. It is required that signal M2 be broken into two components. This function is provided by the frame comb filter comprising elements 62-64 which separate the low pass filtered motion signal into spectrally interleaved lowpass (M4) and high-pass (M5) components. With two components of signal M3 thus obtained, elements 65-67 quadrature modulate and combine the components to provide the enhancement signal E. To avoid interference of the modulated spectra, the phase of the conversion frequency F2 is alternated at the frame rate (FV/2).

Figure 4C:
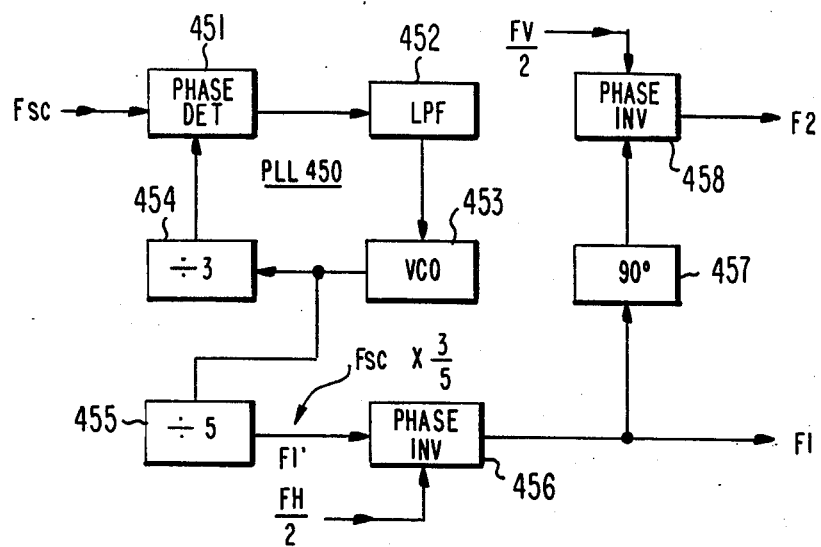
FIGS. 4C and 4D are block diagrams illustrating conversion frequency generation in the system of FIG. 1.
Figure 4D:
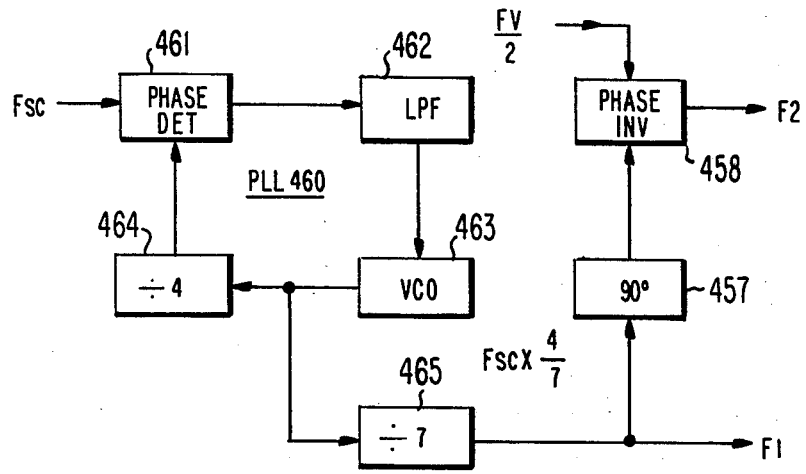

In more detail, the conversion frequencies F1 and F2 may be either odd or even multiples of one-half the line rate but must include a frame rate offset. FIGS. 4C and 4D show specific examples of the conversion frequency generation for odd and even multiples of one-half the horizontal line rate. In FIG. 4C a phase lock loop PLL 450 (elements 451-455) multiplies the color subcarrier Fsc by 3/5 thus providing a conversion frequency F1' of an odd multiple of one-half the line rate (273 FH/2). Since the I chroma component has spectra extending into the 2-3 MHz region at odd multiples of FH/2, a phase inverter 456 operating at FH/2 is used to reverse the phase of F1 every other line thereby avoiding possible interference with wideband "I" chroma component. Conversion signal F2 is generated by delaying signal F1 by 90 degrees in delay unit 457. The FV/2 offset necessary to prevent interference of the F2 spectra is provided by a phase inverter 458 which reverses the phase of signal F2 at the frame rate (FV/2). In the example of FIG. 4D the conversion signals are even multiples of FH/2 (i.e., 260 FH/2). Phase lock loop 460 (elements 461-465) multiply the color carrier Fsc by 4/7 to produce conversion signal F1. Since this is not an odd multiple of FH/2 there is no need for phase inverter 456 to avoid chroma (I) interference. Signal F2 is generated as in FIG. 4C by phase shifting and inverting the phase of signal F1 at the frame rate (FV/2).

Progressive scan receiver 14 (FIG. 1) includes circuitry for separating the enhancement signal E from the compatible input signal S1 and reconstituting the original image in progressive scan form for display on display 18. Tuner 70 converts the RF signal S1 to baseband form S2. Filter 80 separates the NTSC and enhancement (E) components. Decoder 90 decodes the E signal to recover the motion signal M2. The NTSC component is applied to a luma/chroma separator 100 which supplies the chroma component C to a demodulator 110 and the luma component (Y3) to a pair of 1-MHz low and high pass filters 130 and 140. The chroma signal components I3 and Q3 provided by demodulator 110 are applied to a speed-up unit 140 which doubles their line rate by repeating each line to provide double linerate chroma signals I4 and Q4 to a matrix unit 150. (Interpolation may be used rather than repeating). The high pass filtered luma signal (Y4) is applied to a speedup unit 160 which generates a double line-rate luma signal Y6 by time compressing and interleaving lines of the current and previously received fields of signal Y4. The low pass filtered luma signal Y5 (A+B) is applied along with the decoded motion signal M2 (A−B) to a matrix and speed-up unit 170 which generates a double line rate enhancement signal Y7 by matrixing and time compressing the low frequency portion of luma signal Y3 with the recovered motion (difference) signal M2. An adder 180 combines the luma signals Y6 and Y7 and applies the sum Y8 to matrix 150 which, in turn, supplies progressive scan RGB signals to display 18.

FIG. 2D illustrates the operation of matrix and speedup unit 170 for the condition where field "B" of the camera signal is reconstituted. Line B1 is generated by time compressing and matrixing the low frequency portion of the luma signal Y5 with the motion signal M2. Specifically, for field B line 1, signal Y7 equals A1+B1 of the previous field minus A1−B1 of the previous field. All odd lines are so recovered (e.g., B3=(A3+B3)−(A3−B3) etc). Even lines are recovered by addition of lines of the current field (B2=(B2+C2)+(B2−C2) etc). Thus all lines of the original field "B" are recovered.

Figure 5:
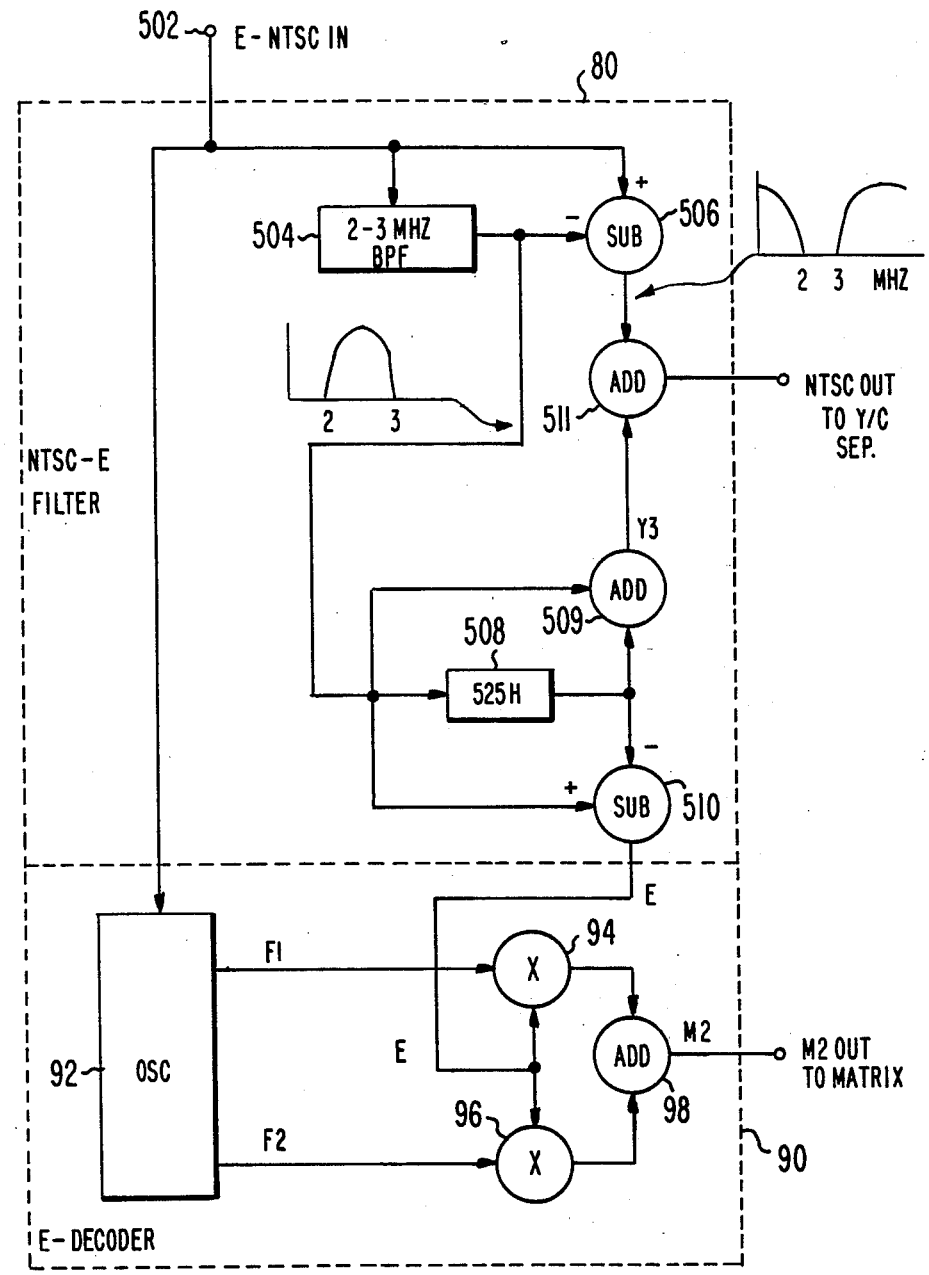
FIGS. 5-8 are detailed block diagrams of portions of the decoder portion of the system of FIG. 1.

FIG. 5 shows the details of filter 80 and decoder 90. The enhanced signal at terminal 502 is applied to a 1-3 MHz bandpass filter 504. The filter output is subtracted from its input by subtractor to create a 1-3 MHz notch in the subtractor output as shown. A frame comb filter (508-510) separates Y3 and E from the filtered signal. Frame comb filtered signal Y3 is added by adder 511 to the subtractor 506 output to reconstitute the luma sum signal. The subtractive output (510) of the frame comb filter (508-510) is demodulated to provide motion signal M2 in decoder 90. The decoder 90 comprises an oscillator 92 which generates conversion signals F1 and F2 as previously described. Signal E is multiplied in multiplier 94 and 96 and the resultant product signals are added in adder 98 to recover the motion signal M2.

Figure 6:
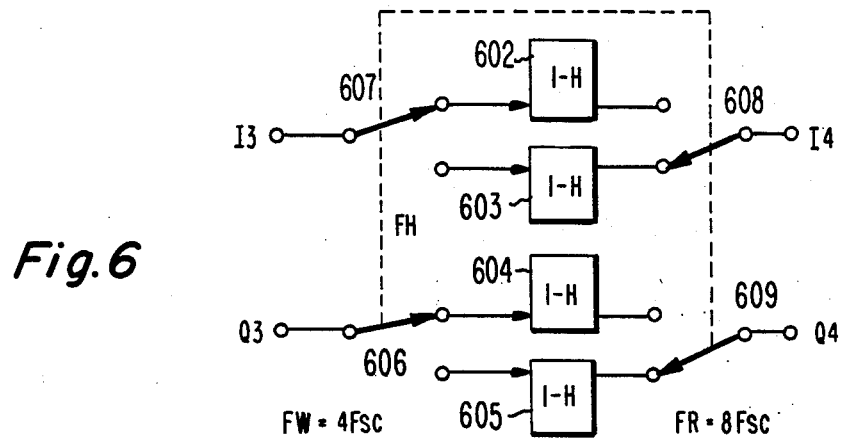
Figure 7:
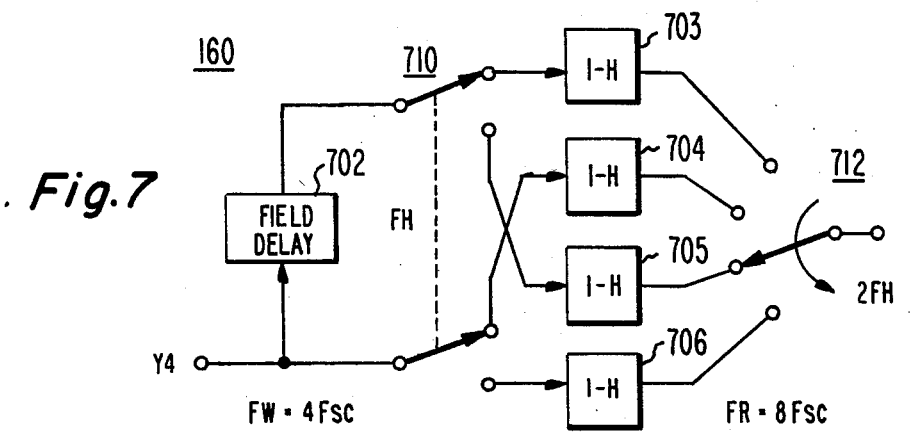
Figure 8:
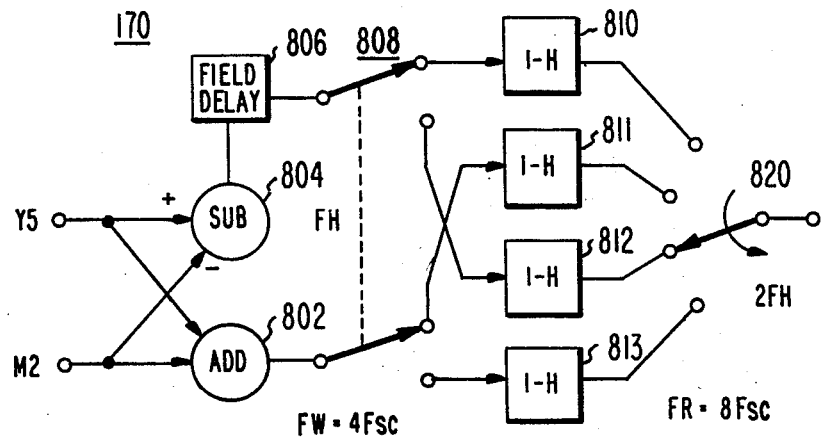

FIGS. 6, 7 and 8 provide details of speed-up units 140, 160 and 170. In FIG. 6 the I3 and Q3 signals are stored in respective memories (602-605) at a write clock rate of, illustratively, 4 Fsc and recovered twice at a read clock rate of 8 Fsc by means of switches 606-609. Accordingly, each I and Q signal is doubled in line rate by repeating each line. In FIG. 7 the line rate of the high frequency luma signal Y4 is doubled by delaying Y4 by one field in unit 702. A switch 710 stores the delayed and non-delayed signal Y4 in memories 703 and 704 while switch 712 reads the previously stored delayed and non-delayed lines in memories 704 and 706 sequentially at twice the write clock rate. Accordingly each line of signal Y4 is time compressed and interleaved with lines of the previous field. In FIG. 8 adder 802 and subtractor 804 add and subtract the luma signal Y5 and the motion signal 2. The difference signal is field delayed by unit 806. The field delayed difference signal and the non-delayed sum signal are time compressed and interleaved by means of switch 808 which stores these signals in parallel in memories 810-813 while switch 820 recovers the stored signals sequentially at twice the write clock rate.

Figure 9:
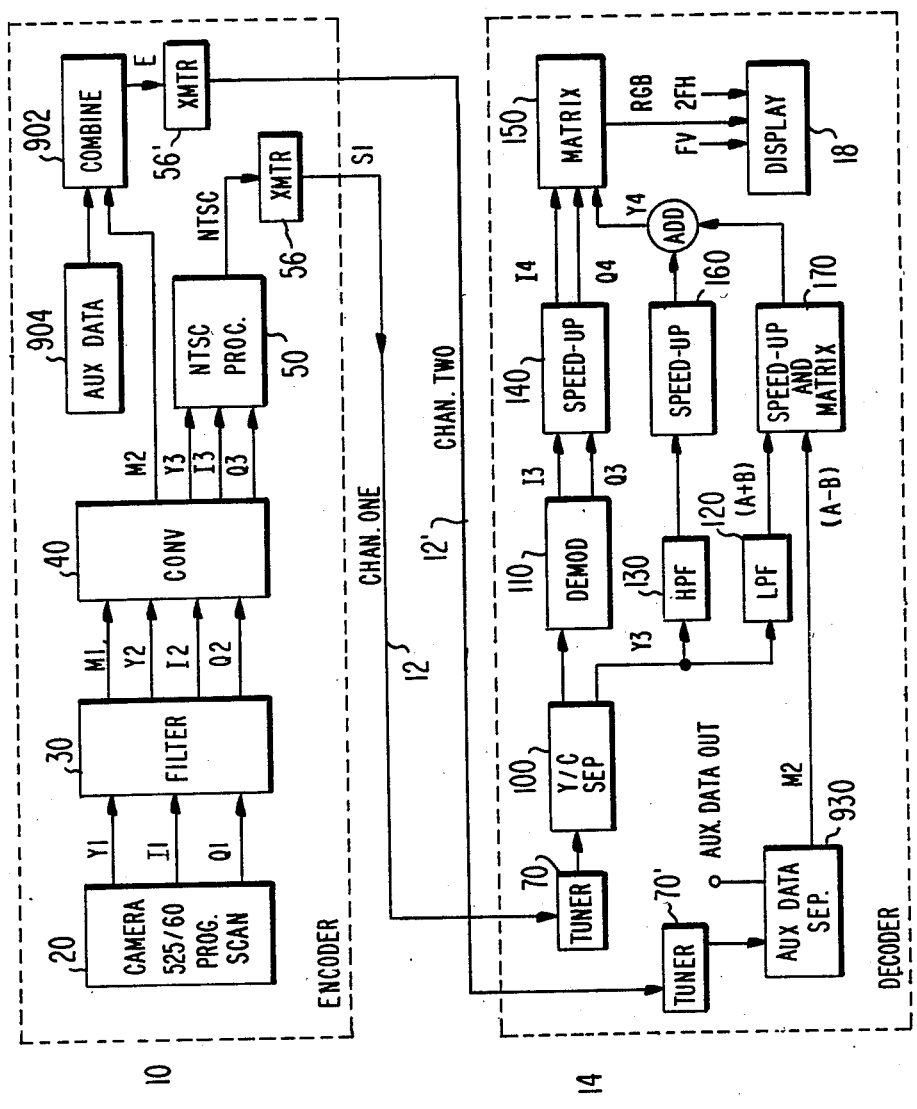
FIG. 9 is a block diagram illustrating modifications of the system of FIG. 1.

The system of FIG. 1 may be modified as shown in FIG. 9 to convey the enhancement signal E and auxiliary data via a separate transmission path 12' to receiver 14. In the modified system encoder 60, adder 55, filter 80 and decoder 90 have been deleted. The compatible NTSC signal S1 is applied directly to transmitter 56 for transmission via the channel-one path 12 to tuner 70 which recovers the baseband compatible (sum) signal for application directly to Y/C separator 100. The enhancement signal E comprises the motion signal M2 combined in combiner 902 with auxiliary data provided by an auxiliary data source 904 and transmitted via a second transmitter 56' and transmission path 12' (channel two) to receiver 14. The auxiliary data may comprise digital audio signals, wide screen edge enhancement video signals or other suitable data. In receiver 14 a second tuner 70' is provided for converting the transmitted enhanced signal to baseband form and an auxiliary data separator 930 separates the motion component M2 and auxiliary data signals.

In this example of the invention the use of separate channels avoids the need for encoding motion signal M2 as in the example of FIG. 1. Two channels are required but the second channel provides capacity for audio as well as video (e.g., wide screen) enhancements. The channel one signal, as in FIG. 1, is fully compatible with existing receivers.

What is claimed is:

1. A progressive scan encoder, comprising:
   signal source means for providing a first luminance signal of given line scan form and having a line-rate greater than that of a given broadcast standard;
   temporal filter means coupled to said signal source means for adding corresponding lines of adjacent fields of said luminance signal to provide a sum output signal and for subtracting said corresponding lines of said adjacent fields to provide a difference signal;
   sub-sampling time-expanding converter means coupled to said filter means for selecting every other line of each of said sum and difference signals and for time expanding the selected lines of each of said sum and difference signals by a selected factor to provide a processed sum output signal compatible with said given broadcast standard and a processed difference output signal; and
   transmission means coupled to said converter means for transmitting said output signals.

2. An encoder as recited in claim 1 wherein said transmission means comprises:
   encoder means for translating said processed difference signal to a midband region of said processed sum signal;
   combining means for combining said translated difference signal with said processed sum signal; and wherein
   said transmission means comprises means for transmitting said combined signals in a common channel.

3. An encoder as recited in claim 2 wherein said encoder means includes means for quadrature modulating said processed difference signal on a carrier wave.

4. An encoder as recited in claim 3 wherein said quadrature modulating means includes first means for separating said processed difference signal into two components, second means for multiplying said two components by respective quadrature related carrier frequencies to provide two product signals and; third means for summing the product signals produced by said second means.

5. An encoder as recited in claim 1 wherein said transmission means comprises respective separate transmission channels for transmitting said output signals.

6. A progressive scan receiver, comprising:
   input means for receiving an encoded video input signal manifestation and providing a first luminance output signal representing a sum of corresponding lines in adjacent fields of a progressively scanned image and providing a second luminance output signal representations of a difference of said corresponding lines of said progressively scanned image;
   filter means for separating said first luminance signal into high and low frequency portions;
   first speed-up circuit means for doubling the line rate of said high frequency portion by time compressing and interleaving lines of currently received and previous fields to provide a double line-rate luminance output signal;
   second speed-up circuit means for generating a double line-rate enhancement signal by matrixing and time compressing the low frequency portion of said first luminance signal with said second luminance signal; and
   means for combining said double line-rate luminance and enhancement signals for application to a display.

7. A receiver as recited in claim 6 wherein said second luminance output signal is conveyed by quadrature amplitude modulation as a component of said input signal manifestation and wherein said input means includes means for demodulating said quadrature amplitude modulation component by multiplication with first and second quadrature related signals, one of said quadrature related signals having a predetermined temporal offset component.

8. A receiver as recited in claim 6 wherein said input means includes filter means for separating said first luminance signal from said input signal manifestation and a quadrature demodulator means for separating said second luminance signal from said input signal manifestation.

9. A receiver as recited in claim 8 wherein said quadrature demodulator means employs first and second quadrature conversion frequencies one of which is subjected to frame rate phase reversal.

10. A receiver as recited in claim 6 wherein said receiver includes separate tuner means for recovering said first and second luminance signals from said video input signal manifestation.

* * * * *